United States Patent
Rameshni et al.

(10) Patent No.: US 7,824,638 B2
(45) Date of Patent: Nov. 2, 2010

(54) PROCESS FOR CATALYTIC TAIL GAS INCINERATION

(75) Inventors: Mahin Rameshni, Monrovia, CA (US); Stephen Santo, Monrovia, CA (US)

(73) Assignee: Worleyparsons Group, Inc., Arcadia, CA (US)

( * ) Notice: Subject to any disclaimer, the term of this patent is extended or adjusted under 35 U.S.C. 154(b) by 0 days.

(21) Appl. No.: 12/398,167

(22) Filed: Mar. 4, 2009

(65) Prior Publication Data

US 2009/0226354 A1 Sep. 10, 2009

Related U.S. Application Data

(60) Provisional application No. 61/033,692, filed on Mar. 4, 2008.

(51) Int. Cl.
*C01B 17/16* (2006.01)
*C01B 17/50* (2006.01)

(52) U.S. Cl. .............. 423/242.1; 423/244.01; 423/244.06; 423/244.09; 423/244.1; 423/539; 423/563; 423/573.1; 423/576.8

(58) Field of Classification Search .............. 423/242.1, 423/244.01, 244.06, 244.09, 244.1, 539, 423/563, 573.1, 576.8
See application file for complete search history.

(56) References Cited

U.S. PATENT DOCUMENTS

| | | | |
|---|---|---|---|
| 4,123,507 A * | 10/1978 | Hass | 423/574.1 |
| 4,311,683 A | 1/1982 | Hass et al. | |
| 4,444,742 A | 4/1984 | Hass et al. | |
| 4,444,908 A * | 4/1984 | Hass et al. | 502/247 |
| 4,552,746 A | 11/1985 | Kettner et al. | |
| 4,818,740 A * | 4/1989 | Berben et al. | 502/313 |
| 5,037,629 A * | 8/1991 | Berben et al. | 423/576.8 |
| 5,676,921 A | 10/1997 | Heisel et al. | |
| 2008/0311030 A1 | 12/2008 | Boll et al. | |
| 2009/0136404 A1 * | 5/2009 | Massie | 423/244.02 |

FOREIGN PATENT DOCUMENTS

DE 10 2005 022 164 A1 11/2006

OTHER PUBLICATIONS

International Search Report for Corresponding International Patent Application No. PCT/US2009/036064, mailed Jun. 22, 2009.
Written Opinion of the International Searching Authority for Corresponding International Patent Application No. PCT/US2009/036064, mailed Jun. 22, 2009.

* cited by examiner

*Primary Examiner*—Timothy C Vanoy
(74) *Attorney, Agent, or Firm*—Locke Lord Bissell & Liddell LLP

(57) ABSTRACT

This disclosure relates generally to processes for efficient incineration and conversion of the tail gas streams from sulfur recovery units containing sulfur compounds such as $H_2S$, $CO_2$, COS, $CS_2$, and other sulfur species and sulfur vapors from $S_1$ to $S_8$ to $SO_2$. The present disclosure describes the use of a combination of catalysts to achieve efficient oxidation of all reduced sulfur compounds as well as oxidation of CO and $H_2$ to meet the industry emission requirements. The catalytic tail gas incineration process described herein can advantageously operate at lower temperatures, which in turn can represent a savings in reduced fuel gas costs.

24 Claims, 2 Drawing Sheets

US 7,824,638 B2

PROCESS FOR CATALYTIC TAIL GAS INCINERATION

CROSS REFERENCE TO RELATED APPLICATIONS

The present application claims priority to U.S. Provisional Patent Application Ser. No. 61/033,692, filed Mar. 4, 2008, the contents of all of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

This disclosure relates generally to processes for the treatment of tail gas streams from sulfur recovery units containing sulfur compounds, and more particularly, to catalytic processes for the efficient oxidation of sulfur compounds contained within such tail gas waste streams.

2. Description of the Related Art

The tail gas streams from sulfur recovery units are typically vented to the atmosphere through the incineration or are processed in the conventional tail gas unit such as by the SCOT™ (Shell Claus Off-gas Treating) Process or Parsons BSR (Beavon Sulfur Removal)/SELECTOX™-type processes, where BSR and SCOTT™ are followed by the amine unit operating at the high temperature and consumed significant fuel gas with high $CO_2$ emissions.

The reduction of fuel consumptions and $CO_2$ emissions are related to economic advantages and support Green House Gases accordingly by using the combination of the proper catalysts and the proper operation to eliminate side reactions. Other approaches described in the art have utilized interesting methodologies, but methodologies which nonetheless are often not applicable to large-scale or industrial process situations, are often cost inefficient, may result in the formation of other, non-desirable products, and/or do not have high recovery and/or product quality values. Additionally, these other approaches often suffer the drawback that the catalysts are not efficient to prevent side reactions which produce additional, undesirable byproducts.

From the above brief descriptions, it can be appreciated that numerous of the prior art catalytic incineration of Claus Tail gas processes suffer from the disadvantage of producing a loss of catalyst activity, high percentages of CO and $H_2$ oxidation, undesirable thermal shifts, and overall low recovery.

This application for patent describes processes for the catalytic incineration of Claus Tail gases and components thereof.

BRIEF SUMMARY OF THE INVENTION

The present disclosure describes methods and processes for the catalytic incineration of tail gas streams containing sulfur and related components from Claus reactors in a more efficient manner.

In accordance with an embodiment of the present disclosure, a process for the catalytic reduction of tail gas feed streams of sulfur recovery units in a tail gas incineration unit is described, wherein the process comprises passing a tail gas feed stream through a first reactor comprising a low temperature hydrogenation catalyst; and passing the hydrogenated tail gas feed stream through a second reactor comprising a direct oxidation catalyst. In further accordance with this embodiment, the hydrogenation catalyst comprises an inorganic support material and non-support material metals, the latter of which comprising at least one Group VIII metal and/or at least one Group VI metal, alone or as mixtures thereof. As a further aspect of this embodiment, the direct oxidation catalyst of the second reactor comprises vanadium (V) components selected from the group consisting of one or more vanadium oxides and sulfides, bismuth (Bi) components selected from the group consisting of bismuth oxides and sulfides, and/or titanium (Ti) components, all of which are preferably supported on an inorganic support material, such as alumina, silica, or alumina-silica.

BRIEF DESCRIPTION OF THE SEVERAL VIEWS OF THE DRAWINGS

The following figures form a part of the present specification and are included to further demonstrate certain aspects of the present invention. The invention may be better understood by reference to one or more of these figures in combination with the detailed description of specific embodiments presented herein.

Figure 1:
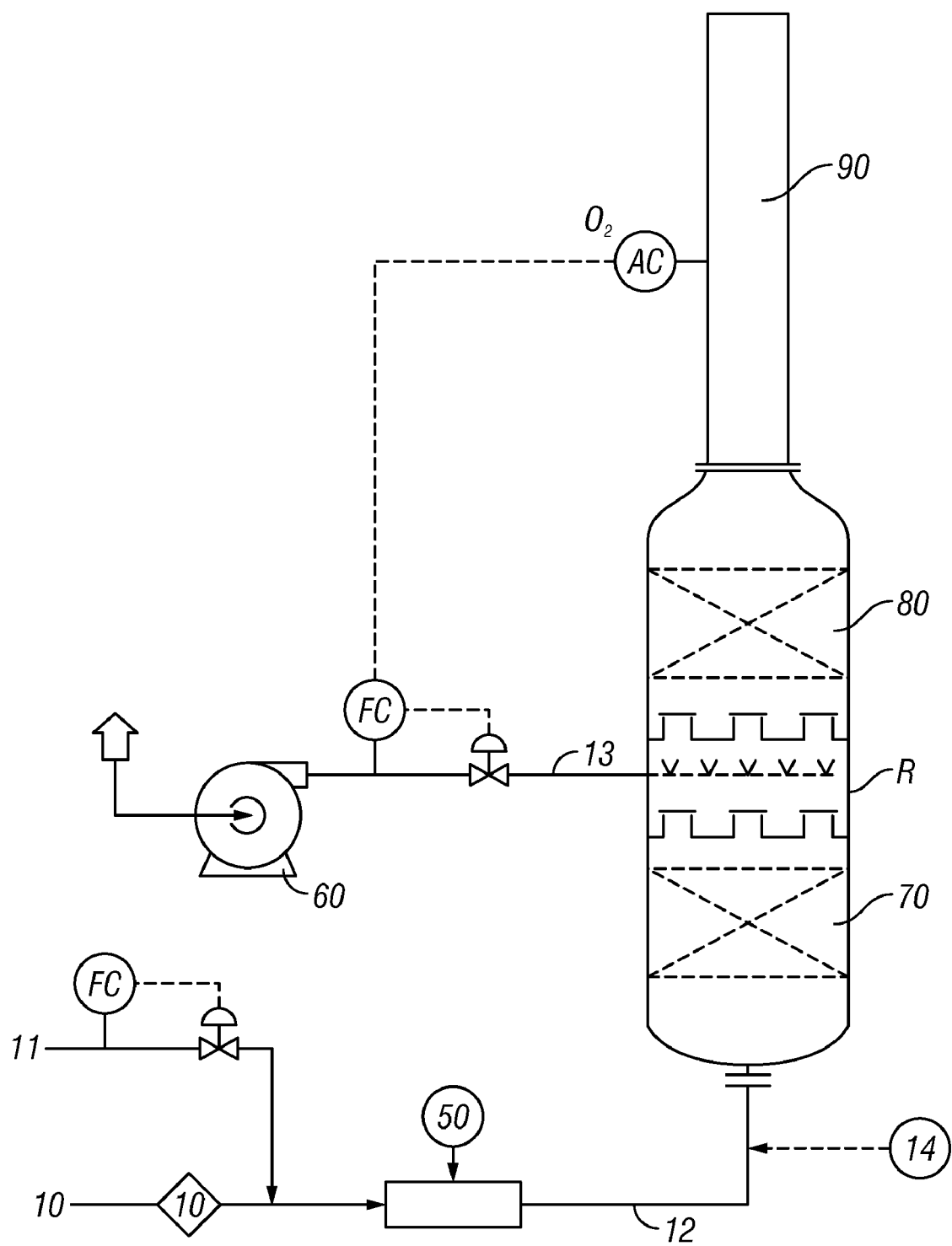
FIG. 1 illustrates a schematic diagram of an embodiment of the process of the present disclosure.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicants have created new processes to generally processes or otherwise treat tail gas streams from the sulfur recovery units containing sulfur compounds comprising the components including, but not limited to $H_2S$, $SO_2$, CO, $H_2O$, $CO_2$, $H_2$, COS, $CS_2$, sulfur vapors such as those from $S_1$ to $S_8$, and related sulfur species by conversion to sulfur dioxide ($SO_2$) in a reasonable and economical manner. This process for the destruction of reduced sulfur species in a Claus tail gas stream by incineration to $SO_2$ requires the combustion of fuel gas to achieve temperature from about 650° C. (1202° F.) to about 850° C. (1562° F.) in order to attain nearly complete (greater than 90%) conversion of all species. The processes described herein include the use of a combination of catalyst systems in order to achieve the efficient oxidation of all reduced sulfur compounds, as well as the oxidation of CO and $H_2$, so as to meet industry emission requirements. The catalytic tail gas incineration process described herein can advantageously operate at lower temperatures than previous methods, which results in an economic savings in the overall process due to reduced fuel sale costs.

This disclosure more specifically relates to catalytic incineration processes of the tail gas streams from sulfur recovery units containing sulfur compounds such as $H_2S$, $SO_2$, CO, $CO_2$, $H_2O$, $H_2$, $N_2$, Ar, COS, $CS_2$, and related sulfur species by conversion to $SO_2$. Destruction of reduced sulfur species in a Claus tail gas by incineration to $SO_2$ requires the combustion of fuel gas to achieve a high enough temperature, such as from about 650° C. to about 850° C., in order to attain complete conversion of all species. The presently disclosed incineration process comprises the use of one or more hydrogenation catalysts of the type commonly employed in a Claus tail gas hydrogenation unit, such as low-temperature hydrogenation catalysts, followed by selective catalytic oxidation, using catalysts comprising bismuth and/or vanadium for oxidizing hydrogen sulfide to sulfur or $SO_2$. The proper combination allows for oxidation of all reduced sulfur compounds as well as oxidation of CO and $H_2$ with significant lower emission.

As will be described in more detail herein, suitable bismuth and/or vanadium catalysts include (without limitation) SELECTOX™ burners/beds, as described in U.S. Pat. No. 4,444,742 and by Kohl, et al. [in *Gas Purification*, 4th Ed.; Gulf Publishing Company, Houston (1985)]. Key advantages of the presently disclosed processes are lower fuel consumption and favorable operability parameters (e.g., reasonable capital and operating costs), as well as reduced gas emissions.

More specifically, in typical sulfur recovery processes, gas streams from the sulfur recovery units contain $H_2S$, $SO_2$, sulfur species, $N_2$, $CO_2$, $H_2O$, $H_2$, Argon, COS and $CS_2$, among other components. The incineration process of the present disclosure may take place in two reactors, or in one reactor with 2 different catalyst beds, after the gas is heated to adequate temperatures. In the first catalytic reactor, the sulfur components such as $SO_2$, COS, $CS_2$, and $S_1$-$S_8$ sulfur species are simultaneously converted at elevated temperature (usually from about 300° F. to about 900° F.) to $H_2S$ by reaction with hydrogen and/or water vapor in the presence of catalyst components of Co, Mo, Fe, W, and Ni, with a combination of Co with Mo or Ni being preferred. In the next stage of the process, the gas leaving the first reactor, which will then typically contain hydrogen sulfide ($H_2S$) as substantially the only gaseous sulfur component, which may then be treated in a second reactor using a direct oxidation catalyst such as SELECTOX™ or the equivalent in order to convent substantially all of the $H_2S$ to $SO_2$.

In accordance with the present disclosure, the second reactor or the second catalyst bed contains one or more direct oxidation catalysts, at least one of which comprises bismuth and vanadium components, both of which are highly active and stable, (especially in the presence of water vapor) for the oxidation of $H_2S$ to $SO_2$ with the excess oxygen present. Additionally, one or more of the oxidation catalysts in the second catalyst bed may also optionally contain titanium (Ti).

It may also comprise one or more vanadium oxides or sulfides supported on an appropriate refractory oxide such alumina or silica-alumina and/or titanium (Ti). The direct oxidation catalyst may also contain of bismuth in order to catalytically incinerate and convert $H_2S$ to $SO_2$. More particularly, the presently disclosed methods may be used to convert $H_2S$ to $SO_2$ by contacting excess oxygen entering the reactor with the process gas stream mixtures containing $H_2S$, whereupon the reaction occurs over the catalyst bed under appropriate conditions, such that the desired conversion of $H_2S$ to $SO_2$ may be accomplished.

The process of the present invention typically comprises at least two, and in some instances, three main sections.

As will be described in more detail herein, the first section is the tail gas feed from the sulfur recovery unit(s), which needs to be heated to the appropriate temperature before entering the reactors. The heating system may be any appropriate heating system known to those of skill in the art, including but not limited to indirect heating systems, fired reheaters, or any commonly-used type of reheater, such as a steam reheater or a moisture separator reheater (MSR).

The second and the third sections of the systems described and encompassed herein comprise two different catalysts, which can be in one vessel with two different catalyst beds separated from each other, or alternatively and equally acceptable, can be in two, individual vessels. Preferably, the catalyst are contained in a single vessel, the benefit being to reduce the capital cost of the overall unit.

The second section of the system is a hydrogenation reactor. The heated gas flows to a catalytic reactor using hydrogenation catalysts of the type commonly employed in the Claus tail gas hydrogenation unit (e.g., cobalt-molybdenum hydrogenation catalyst), preferably one or more low temperature hydrogenation catalysts such as those employed in units that treat tail gas from Claus sulfur recovery units. The catalyst promotes the Claus reaction and (1) shifts CO to $CO_2$ and $H_2$, (2) consumes residual $H_2$ to further reduce $SO_2$ to $H_2S$, and (3) hydrolyzes COS and $CS_2$ to $H_2S$ and $CO_2$. Hydrogen is required in the hydrogenation reactor. The hydrogen may be supplied as an external source to the reactor, or if the heating system is a commonly-used BSR reducing gas generator, then hydrogen will be produced or if the sulfur plant operates as off-ratio the adequate amount of hydrogen exists in the gas entering the reactor.

The third section is the direct oxidation catalyst reactor. It is known that the catalyst comprising bismuth and vanadium (such as Selectox™) components are highly active for the gas phase oxidation of $H_2S$ to $SO_2$ in the presence of the water vapor at the operating temperature below about 600° F. (about 315.5° C.). At the proper operating conditions, the oxidation of $H_2$, CO, $NH_3$ are minimized while at the same time formation of unwanted sulfur trioxide ($SO_3$) is prevented. The mixtures gas leaving from the first reactor enters to the second reactor where external air or oxygen supply is added to the reactor, air supply is through the tail gas air blower. The oxygen will promote the oxidation process of converting $H_2S$ to $SO_2$ and the excess oxygen is required. One important aspect of the combination of the low temperature hydrogenation bed followed by an oxidation catalyst is that the tail gas being treated is heated to meet the minimum temperature requirement of the hydrogenation reactor and that heat is released in the first bed to help preheat the gas in the second bed so as to meet the adequate temperature in the second bed while saving the fuel consumption and lowering CO and $H_2$ emission.

The active oxidation catalyst is used in the second reactor or the second bed of this invention comprise as minimum but not limited as vanadium, bismuth as the essential active components, and may be present as V and Bi or any combinations of mixtures of these components and other individual including titanium (Ti).

In accordance with aspects of the present invention, it is an object of the present disclosure to provide a process for producing sulfur dioxide from the tail gas stream from the sulfur recovery units. A further object of the present disclosure is to provide such a process which results in a minimum number of byproducts and less fuel consumption.

The gas leaving the second reactor can be vented to the atmosphere through the stack or could be sent to other units such as caustic $SO_2$ recovery, Cansolv amine type unit or similar solvent or any other units for $SO_2$ absorption or $SO_2$ recovery.

A further object of the present invention is the provision of an efficient process for processing the tail gas feed and converting to sulfur dioxide by reducing fuel consumption, reducing $CO_2$ emissions and support Green House Gases and economically acceptable for, present day industrial operations. Another object is to provide such a process which can tolerate variances in operating conditions within a given range without major equipment adaptations. A further object is to provide a process which can be utilized in coaching phases to provide, at acceptable economics, the capacity required in present-day industrial operations.

In accordance with further aspects of the present invention, processes for catalytic tail gas incineration are described, wherein the processes comprise heating the streams mixtures of gases containing sulfur species such as $H_2S$, $SO_2$, COS, $CS_2$, CO, $CO_2$, $H_2O$, Ar, $H_2$, and $N_2$ the effluent stream from the sulfur recovery unit prior to entering in a hydrogenation reactor resulting in hydrogenation of $SO_2$ to $H_2S$ and then the direct oxidation to $SO_2$.

In the discussion of the Figures, it should be noted that the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

Turning now to the figures, in FIG. 1, an exemplary process in accordance with the present disclosure is illustrated. As shown therein, a tail gas feed stream (10) from a sulfur recovery unit, typically comprising one or more of $H_2S$, $SO_2$, $CO_2$, COS, $CS_2$, $H_2$, $N_2$, $H_2O$, sulfur vapors as $S_1$ to $S_8$ and/or similar sulfur species, is heated in a common type heater (50) known to those skilled in the art to generate a heated feed stream (12). Exemplary heaters (50) include those heaters know to those of skill in the art, such as a heat exchanger containing media, or a fire-type reheater. Optionally, a low pressure (LP) steam or nitrogen stream (11) may be introduced into the Claus tail gas feed stream (10), in order to minimize and/or displace oxygen present in the tail gas feed stream, as although the unit is not in operation to prevent the hydrogenation catalyst's exposure to the air, it is known that hydrogenation catalysts can become deactivated or exhibit reduced catalytic activity if oxygen is present.

The heated gas stream (12) then enters a reactor, such as a reactor bed or the like, containing one or more hydrogenation catalysts, preferably a low temperature hydrogenation catalyst. The heated gas flows to the vessel (70) catalytic reactor which may be comprised of two different catalysts, as will be described in more detail herein. First the gas flows through the hydrogenation catalyst of the type commonly employed in the Claus tail gas hydrogenation unit (such as a cobalt-molybdenum hydrogenation catalyst), preferably a low temperature hydrogenation catalyst such as those employed in units that treat tail gas from Claus sulfur recovery units. The hydrogenation catalyst promotes the Claus reaction and (1) shifts CO to $CO_2$ and $H_2$, (2) consumes residual $H_2$ to further reduce $SO_2$ to $H_2S$, and (3) hydrolyzes COS and $CS_2$ to $H_2S$ and $CO_2$.

Hydrogen gas itself may also be required in the hydrogenation reactor. The hydrogen may be supplied optionally as an external source stream (14) to the heated gas to the reactor, or if the heating system is a common BSR (Beavon Sulfur Removal)-type reducing gas generator, then hydrogen will be produced as a direct result. Alternatively, if the sulfur plant operates as an off-ratio higher than the 2:1 ratio of $H_2S/SO_2$ then the adequate amount of hydrogen will exist in the tail gas feed entering the reactor in this invention.

The $H_2$ and CO present in the tail gas from the Claus units, react with the sulfur vapor and $SO_2$ in the tail gas over a catalyst bed to form $H_2S$. The low temperature hydrogenation catalyst also promotes the hydrolysis, i.e. reaction with water, of COS and $CS_2$ to form $H_2S$. Hydrogenation and hydrolysis reactions for the four primary sulfur constituents are as follows:

Hydrogenation Reactions:

$$S + H_2 \rightarrow H_2S \tag{1}$$

$$SO_2 + 3H_2 \rightarrow H_2S + 2H_2O \tag{2}$$

Hydrolysis Reactions:

$$CS_2 + 2H_2O \rightarrow 2H_2S + CO_2 \tag{3}$$

$$COS + H_2O \rightarrow H_2S + CO_2 \tag{4}$$

CO does not react directly, but is converted to $H_2$ over the catalyst by the water shift reaction:

$$CO + H_2O \rightarrow H_2 + CO_2 \tag{5}$$

These reactions are exothermic. In the low temperature hydrogenation reactor, sulfur compounds are converted to $H_2S$ by the hydrogenation and hydrolysis reactions described above. These reactions are exothermic creating a temperature rise across the catalyst bed.

The gas products then leave the hydrogenation catalyst bed region and proceed toward the direct oxidation catalyst (80) located at or near the top of the Reactor vessel (R). Direct oxidation catalysts comprising bismuth and vanadium components (such as SELECTOX™ type catalysts) are preferred for use as the direct oxidation catalysts, a they are highly active for the gas phase oxidation of $H_2S$ to $SO_2$ in the presence of the water vapor at an operating temperature below about 600° F. (about 315.5° C.). At the proper operating conditions, the oxidation of $H_2$, CO, $NH_3$ are minimized and the same time formation of $SO_3$ is prevented. The direct oxidation catalyst with the contents similar to SELECTOX™ catalyst promotes the selective oxidation of $H_2S$ to $SO_2$ according to the following reaction with the excess of oxygen.

$$H_2S + 3/2\ O_2 \rightarrow SO_2 + H_2O \tag{6}$$

The hydrogenated gas mixture stream leaving the first catalyst bed (70) enters the second catalyst bed (80), where an external air supply stream comprising oxygen gas ($O_2$) is introduced to the reactor bed, through a tail gas air blower (60) or the equivalent. The oxygen acts as a promoter to promote the oxidation process of converting $H_2S$ to $SO_2$ in the process gas stream, a reaction in which excess oxygen is required. The excess oxygen will be measured at the outlet of the reactor on the stack (90) or on the gas stream to the $SO_2$ recovery unit.

The active direct oxidation catalyst which may be used in the second reactor or the second bed of this step of the inventive process comprise vanadium (V), and/or bismuth (Bi) as the essential active components, and may be present as V and Bi or any combinations of mixtures of these components, as well as other individual elements, such as titanium (Ti).

In contrast with the first hydrogenation reaction stage (70), the second reaction stage direct oxidation catalyst (80) comprising at least one low temperature hydrogenation catalyst and direct oxidation catalyst with the components described in this invention or addition of alumina or titania catalyst, which may be associated with any appropriate substrate, and sized appropriately, as described above. As the process stream (12) pass through converters/reaction stages (70) and (80), respectively, residual hydrogen sulfide and sulfur dioxide contained within the streams may be further treated in the $SO_2$ recovery unit or vented to the atmosphere through the stack (90) is located on the top of the reactor.

The minimum inlet temperature of the reactor vessel to the direct oxidation catalyst is about 500° F. (about 260° C.) and the minimum outlet temperature is about 540° F. (about 282° C.).

The amount of hydrogen at the inlet to the direct oxidation reactor and the outlet does not change or minimize the conversion of hydrogen to water.

The hydrogenation catalyst, which may be any appropriate hydrogenation catalyst suitable for the particular use, includes those employed in units that treat tail gas from Claus sulfur recovery units. Such catalysts can be used to promote the Claus reaction within the reactor, and serve the additional purposes of at least 1) shifting the CO equilibrium toward $CO_2$ and $H_2$ production, 2) consuming residual hydrogen so as to further reduce $SO_2$ to $H_2S$, and 3) hydrolyze any COS and $CS_2$ present to $H_2S$ and $CO_2$. A non-limiting, exemplary catalyst system suitable for use herein is a Co/Mo (cobalt-molybdenum) hydrogenation catalyst, which may be supported on any appropriate support know in the art, including but not limited to inorganic supports including but not limited to alumina, aluminosilicates, silica, and zeolites, prepared in any suitable manner, and as described above in association with the process of FIG. 1. Further, while the metals comprising the hydrogenation catalyst preferably comprise cobalt and molybdenum, the catalyst may also comprise components which are generally selected from the Group VI, Group VII, and Group VIII metals of the Periodic Table of the Elements, including but not limited to iron, cobalt, nickel, ruthenium, rhodium, palladium, osmium, iridium and platinum. In accordance with still further aspects of the present disclosure, the catalysts suitable for use with the processes described herein may comprise those containing one or more metals or combinations of metals of Group 4, Group 5, Group 6, Group 8, Group 9, Group 10, Group 14, Group 15 and the Rare Earth series (Group 3 elements and the lanthanides) of the Periodic Table, as described and referenced in "Advanced Inorganic Chemistry, $6^{th}$ Ed." by F. A. Cotton, et al. [Wiley-Interscience, (1999)], any of which can be present on a suitable, conventional inorganic support material. The preferred catalysts for use with the processes described herein include, but are not limited to, those containing one or more of the metals selected from the group consisting of cobalt, Alumina, titanium, iron, chromium, vanadium, nickel, tungsten, germanium, zinc, cerium, and antimony, as well as combinations of two or more of these metals, such as in cobalt-molybdate catalysts. In accordance with one aspect of the present invention, the catalyst comprises titanium. In the event that the catalyst used in the processes of the present disclosure is a mixture of two metals, the ratio (on an atomic basis) of these metals is preferably between about 10:90 and 97.5:2.5, and more particularly ranges from about 25:75 to about 95:5, including ratios between these values, such as about 50:50.

Figure 2:
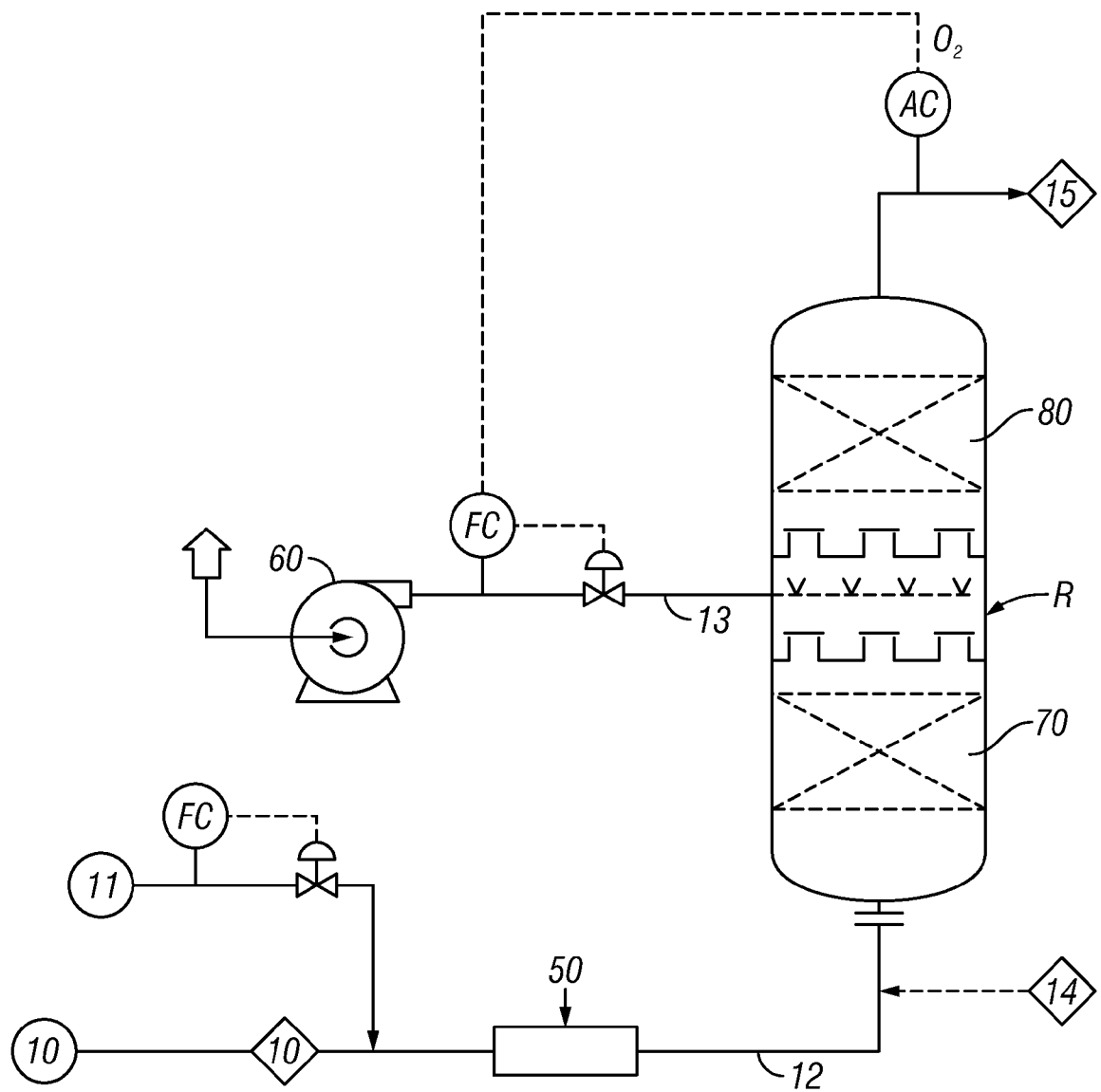
FIG. 2 illustrates a schematic diagram of an alternate embodiment of the process of the present disclosure.

Turning now to FIG. 2, this figure illustrates an alternate embodiment of the process of the present invention. The embodiment illustrated therein is substantially similar to that described in FIG. 1, with the exception that the gas leaving the selective oxidation catalyst (80) may be directed to the $SO_2$ recovery processes such as a caustic scrubber, an amine type unit such as CANSOLV® $SO_2$ scrubbing process (a solvent amine-type unit, as described by Cansolv Technologies, Inc., Montreal, Canada; or the like, or any other $SO_2$ recovery system. It should be noted that, in accordance with aspects of the present invention, the reactor vessel R, which includes both the low temperature hydrogenation catalyst (70) and associated reaction region, as well as the selective oxidation catalyst (80) and associated reaction region, may be in a common vessel or shell, or may be arranged and located in separate vessels, within horizontal or vertical type reactors.

The direct oxidation catalyst (80) is for oxidizing $H_2S$ to $SO_2$ in the gas phase by contacting $H_2S$ in the process gas stream with a catalyst in the presence of oxygen at an elevated temperature. The direct oxidation catalyst typically comprises both vanadium and bismuth as essential components. These essential active components may be present as the element of vanadium and bismuth, or as a mixture of individual vanadium and bismuth compounds, including but not limited to $Bi_2S_3$, and $V_2S_5$ or as any combination of $Bi(VO_3)_3$, $BiVO_4$, $Bi_2O_3.V_2O_5$ OR $Bi_4(V_2O_7)_3$. or as an alternatives the catalyst may contain at least one vanadium oxide or sulfide such as $V_2O_5$, $V_2O_3$, $V_2S_5$, and $V_2S_3$ and at least one bismuth oxide or sulfide such as BiO, $Bi_2O_3$, $Bi_2O_5$, BiS, $BiS_3$, and $BiO_4$. As indicated previously, titanium (Ti) may also be added to the active components in some cases, in order to further promote the reaction.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

What is claimed is:

1. A process for the catalytic reduction of tail gas feed streams from sulfur recovery units in a catalytic tail gas incineration unit, the process comprising:

pre-heating a tail gas feed stream from a sulfur recovery unit containing sulfur compounds for a period of time sufficient to generate a heated feed stream;

passing the heated feed stream through a first reactor comprising a low temperature hydrogenation catalyst;

contacting the tail gas feed stream with the low temperature hydrogenation catalyst for a period of time sufficient to generate a hydrogenated tail gas feed stream containing hydrogen sulfide ($H_2S$); and passing the hydrogenated tail gas feed stream through a second reactor comprising a direct oxidation catalyst, wherein the feed stream passing through the second reactor contacts the direct oxidation catalyst, such that the hydrogenated tail gas feed stream is selectively oxidized such that substantially all of the $H_2S$ in the feed stream is converted to sulfur dioxide ($SO_2$).

2. The process of claim 1, further comprising reheating the tail gas feed stream to a temperature of at least about 410° F. (about 210° C.) before passing the stream through the first reactor.

3. The process of claim 2 where the heater is a heat exchanger with media, a steam reheater, a moisture separator reheater (MSR), or fire-type reheater.

4. The process of claim 1, wherein as the hydrogenated gas stream leaving the first reactor enters the second reactor, excess air from a tail gas air blower is introduced to the second reactor in order to oxidize the sulfur compounds in the streams to $SO_2$.

5. The process of claim 1, further comprising introducing a low pressure (LP) steam of nitrogen gas to protect the hydrogenation catalyst in the first reactor from being exposed to air during start up and shut down processes of the incineration unit.

6. The process of claim 1, wherein the hydrogenation catalyst comprises an inorganic support material and non-support metals comprising at least one Group VIII metal and/or at least one Group VI metal, alone or as mixtures thereof.

7. The process of claim 6, wherein the at least one Group VIII metal is selected from the group consisting of cobalt (Co), iron (Fe), and nickel (Ni), and the Group VI metal is selected from the group consisting of molybdenum (Mo) and tungsten (W).

8. The process of claim 6, wherein the hydrogenation catalyst comprises cobalt, molybdenum, titanium, aluminum, or combinations thereof, on an alumina ($Al_2O_3$) or silica ($SiO_2$) inorganic support material.

9. The process of claim 8, where the hydrogenation catalyst comprises cobalt and molybdenum and an alumina support.

10. The process in claim 1, wherein the first reactor comprises as a hydrogenation step using low temperature catalyst system comprises a hydrogenation catalyst.

11. The process of claim 1, wherein the second reactor is a bed reactor or a converter, and wherein the process comprises a direct oxidation reaction by contacting the process stream with the direct oxidation catalyst.

12. The process of claim 11, wherein the direct oxidation catalyst comprises one or more vanadium oxides or vanadium sulfides, bismuth, or titanium, supported on an inorganic support material.

13. The process of claim 12, wherein the inorganic support material is alumina ($Al_2O_3$), silica ($SiO_2$), or silica-alumina.

14. The process of claim 12, wherein the direct oxidation catalyst consists of at least 8 wt. % vanadium components calculated as $V_2O_5$ and at least 10 wt. % bismuth components, calculated as $Bi_2O_3$, on an inorganic support consisting of from about 20 wt. % to about 30 wt. % alumina ($Al_2O_3$).

15. The process of claim 11, wherein the minimum inlet temperature of the second reactor leading to the direct oxidation catalyst is about 500° F. (about 260° C.) and the minimum outlet temperature is about 540° F. (about 282° C.).

16. The process of claim 11, wherein, the amount of hydrogen at the inlet to the reactor and the outlet of the reactor does not change or results in a minimum conversion of hydrogen to water.

17. The process of claim 1, wherein each catalyst comprises at least one metal selected from the Group 4, Group 5, Group 6, Group 8, Group 9, Group 10, Group 14, Group 15, and the Rare Earth Series of the Periodic Table, any Of which may be on an inorganic support material.

18. The process in claim 1 where the oxidation steps comprise one or more catalytic stages.

19. The process of claim 1, further comprising adding hydrogen to the first, hydrogenation reactor where the tail gas feed streams does not contain adequate hydrogen for the hydrogenation reaction.

20. The process of claim 1, further comprising the gas leaving the second reactor entering a waste stack directly or being directed to an $SO_2$ recovery unit.

21. The process of claim 20, wherein the $SO_2$ recovery unit that the gas is directed to includes an amine type recovery unit or a caustic scrubber recovery unit.

22. The process of claim 1, wherein one or both of the reactors are horizontal, vertical, or in a common or a separate shell.

23. The process of claim 1, wherein the process has a sulfur recovery efficiency of about 100%.

24. The process of claim 1, wherein the second reaction stage direct oxidation catalyst comprises at least one low temperature hydrogenation catalyst and a direct oxidation catalyst in association with an appropriate catalytic substrate.

* * * * *